United States Patent [19]
Katsuta

[11] Patent Number: 5,483,638
[45] Date of Patent: Jan. 9, 1996

[54] MICROCOMPUTER WITH TEST MODE SWITCHING FUNCTION

[75] Inventor: Hiroshi Katsuta, Tokyo, Japan

[73] Assignee: NEC Corporation, Tokyo, Japan

[21] Appl. No.: 893,118

[22] Filed: Jun. 3, 1992

[30] Foreign Application Priority Data

Jun. 6, 1991 [JP] Japan ................................. 3-134540

[51] Int. Cl.$^6$ .................................................. G06F 11/00
[52] U.S. Cl. ...................................................... 395/183.06
[58] Field of Search ................................ 371/16.1, 15.1, 371/17, 22.1; 364/221.6, 221.7, 260.2; 395/575

[56] References Cited

U.S. PATENT DOCUMENTS

| 4,967,387 | 10/1990 | Shibasaki et al. | 364/580 |
| 4,989,208 | 1/1991 | Akao et al. | 371/18 |
| 5,068,783 | 11/1991 | Tanagawa et al. | 395/575 |
| 5,089,951 | 2/1992 | Iijima | 395/275 |
| 5,228,139 | 2/1992 | Miwa et al. | 395/575 |

OTHER PUBLICATIONS

Mano, M. M., Digital Design, 1984, pp. 25 and 258.

Primary Examiner—Robert W. Beausoliel, Jr.
Assistant Examiner—Norman M. Wright
Attorney, Agent, or Firm—Whitham, Curtis, Whitham & McGinn

[57] ABSTRACT

A microcomputer provided with test mode switching function includes an execution control unit to control the operation of an operation unit, an bus control unit connected via an internal bus to the operation unit and the execution control unit and a test mode control unit to control the switching to the test mode. The execution control unit has a micro address generating unit capable of generating a particular address to execute a microinstruction which separates the operation unit from the internal bus according to a test mode specification signal from the test mode control unit. Alternatively, the execution control unit has an instruction register capable of outputting, to the micro address generating unit, the instruction code of the microinstruction which separates the operation unit from the internal bus.

6 Claims, 5 Drawing Sheets

MICROCOMPUTER WITH TEST MODE SWITCHING FUNCTION

BACKGROUND OF THE INVENTION

FIELD OF THE INVENTION

This invention relates to a microcomputer comprising LSI (large scale integrated) circuits and other similar devices, and particularly relates to a microcomputer which operates under microprogram control and is provided with a test mode switching function.

DESCRIPTION OF THE PRIOR ART

In recent years, the application range of microcomputers (including one-chip microcomputers and one-chip microprocessors) consisting of LSI circuits or other similar devices is becoming more and more wider and covers office automation applications and home appliances. Under such circumstances, LSI circuits for microcomputers is desired to have higher reliability. Conventionally, a test circuit for operation test is incorporated into an LSI circuit for effective and prompt selection of acceptable LSI devices. Recent LSI circuits usually has its internal hardware divided into a plurality of functional blocks to be tested one by one so as to improve defect detection and ensure high reliability.

Particularly, in case of an LSI circuits for microcomputers with various functions and complicated operation, it is necessary to test the internal blocks under a plurality test modes with switching the modes one by one. For this, an LSI circuits requires a signal switching circuit to switch between normal operation and test, and the number of test circuits incorporated into the blocks tend to increase naturally.

An example of a microcomputer with basic configuration and test mode switching is now briefly explained. Generally, a microcomputer comprises an execution controller to decode the instruction codes to be executed and control the sequence operation related to instruction execution using the internal microprogram, an operation unit for arithmetic logical operation such as addition or subtraction under control of the execution controller, a bus controller to input or output the instruction code and processing data to be processed at the execution controller and the operation unit via external bus terminals, and a test mode controller. These components are connected via internal buses. In such a microcomputer, for switching to the test mode to test the bus controller, for example, a mode specification signal is sent from the test mode controller to entirely disable input of a control signal from the execution controller and forcibly stop the operation of the operation unit. Under such condition, a test vector is input and the execution result is output via an external bus terminal and an internal bus so as to test the bus controller.

The number of control signal groups generated by microprogram at the execution controller in a microcomputer as mentioned above is over 100. Among them, several tens of signals are to specify the drive from the operation unit to the internal bus. In other words, even limiting to the signals which need disabling control for test, the number of signals required is still significant.

For example, when testing the bus controller, to prevent an adverse affect on the test vector input to and the result output from the bus controller due to operation of the operation unit, hardware connected to the internal bus in the operation unit should be disabled to be driven on the bus. For this purpose, several tens of gate circuits need to be prepared in the test circuit corresponding to the number of control signals to suppress the control signal with the test mode signal.

With the complication of control for the hardware function in a microcomputer, control signals as described above tend to increase more and more, causing an overhead problem for the circuits required for tests. In addition, under the condition where the operation clock frequency is becoming higher and higher, delay of signals caused by insertion of gate circuits for test is another drawback. Thus, a test technique with reduced overhead for both hardware scale and performance is desired.

SUMMARY OF THE INVENTION

It is an object of the present invention is to provide a microcomputer which enables switching among test modes using the functions originally given to the microcomputer with eliminating the need of gate circuits to disable various control signals generated according to microinstructions and prevents the performance deterioration due to incorporation of tests circuits.

Another object of the present invention is to provide an economic microcomputer with wide applications which is capable of test control irrespective of the number of control signals according to the microinstruction and which can realize a test circuit with minimum hardware even for high performance and for complicated control.

According to a preferred embodiment of the present invention to attain the objects, a microcomputer provided with test mode switching function comprises operation unit for arithmetic and logical operation, execution control unit to control the operation of the operation unit using microprogram, bus control unit which is connected via an internal bus to the operation unit and the execution control unit and inputs or outputs various instructions and processing data and test mode control unit to control switching for test mode, and the execution control unit is provided with a control storage unit to store microprogram, an instruction register to store the instruction code of the instruction to be executed and a micro address generating unit to generate an address for the control storage unit according to the value of the instruction code given by the instruction register, and the micro address generating unit can generate a particular address data to execute the microinstruction which separates the operation unit from the internal bus for the control storage unit.

According to another preferred embodiment, a microinstruction executed by the particular address data makes the control signals from the execution control unit to the operation unit non-active.

According to still another embodiment, the micro address generating unit comprises an instruction decoder to decode the instruction code from the instruction register and a number of gate circuits the number of which corresponds to the number of bits contained in the generated address, and the output of the instruction decoder is input to a first input terminal of each of the gate circuit and the test mode signal is input to the input terminal of each of the gate circuits.

According to another preferred embodiment of the present invention to attain this object, a microcomputer provided with test mode switching function comprises operation unit for arithmetic and logical operation, execution control unit to control the operation of the operation unit using microprogram, bus control unit which is connected via an internal bus to the operation unit and the execution control unit and inputs or outputs various instructions and processing data and test mode control unit to control switching for test mode, and the execution control unit is provided with a control storage unit to store microprogram, an instruction register to store the instruction code of the instruction to be executed and a micro address generating unit to generate an address for the control storage unit according to the value of the instruction code given by the instruction register, and the instruction register can output to the micro address generating unit the instruction code of the microinstruction which separates the operation unit from the internal bus by test mode specification signals from the test mode control unit.

According to another preferred embodiment, the instruction code output from the instruction register is a code corresponding to the microinstruction which makes the control signals from the execution control unit to the operation unit non-active.

According to still another embodiment, the instruction register has flip-flops of which the number corresponds to the number of bits contained in the instruction code and the test mode signal is input to the reset terminal of the flip-flop.

Other objects, characteristics and effects of the present invention will be clarified in the detailed description below.

DESCRIPTION OF THE PREFERRED EMBODIMENT

Referring now to FIGS. 1 to 7, preferred embodiments of the present invention are described below.

Figure 1:
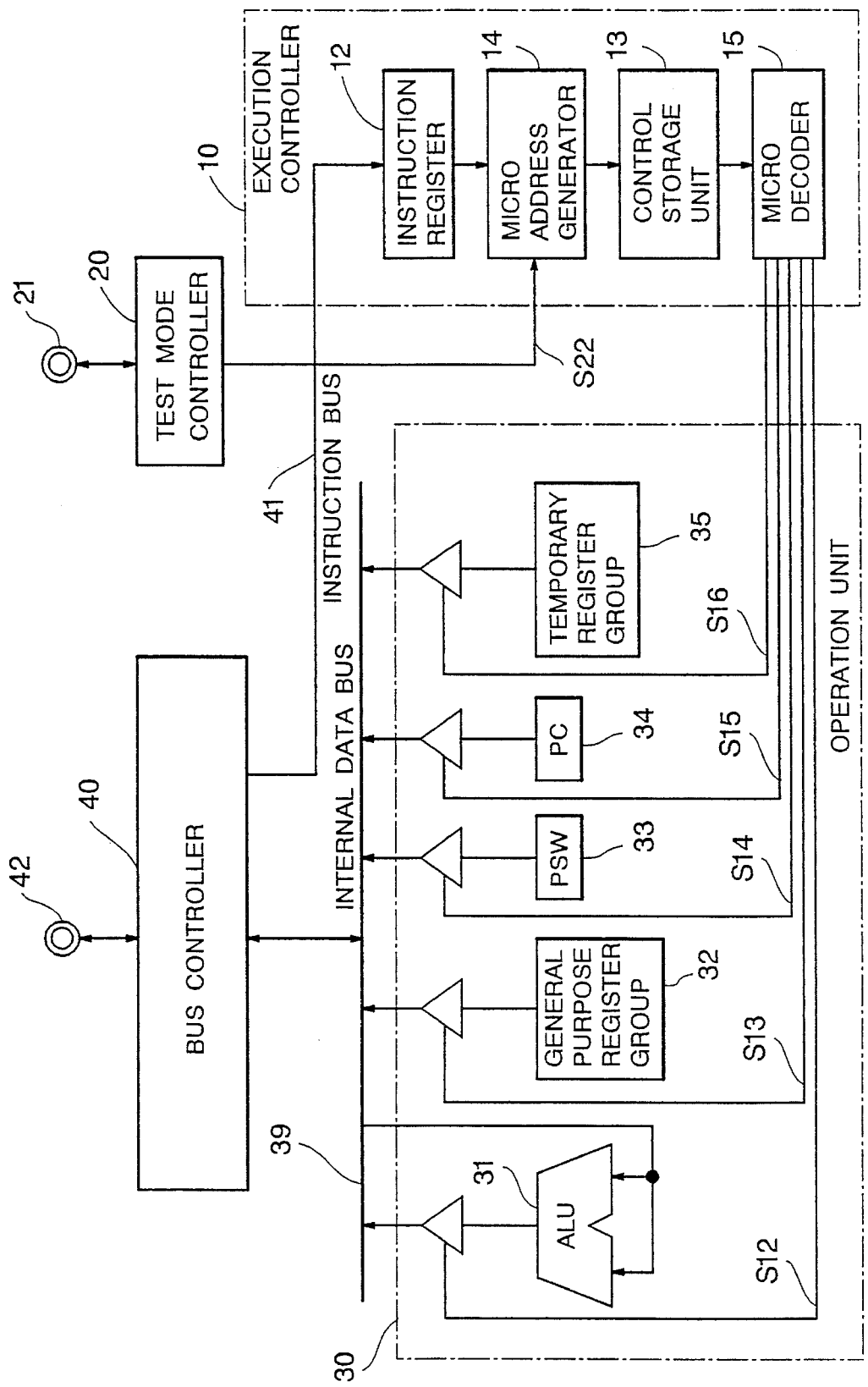
FIG. 1 is a block diagram to show the configuration of a microcomputer provided with test mode switching function according to a first embodiment of the present invention.

FIG. 1 shows the configuration of a microcomputer having test mode switching function according to a first embodiment of the present invention. In FIG. 1, a microcomputer of this embodiment comprises an execution controller 10 to decode the instruction code to be executed and control the sequence operation related to instruction execution using an internal microprogram, an operation unit 30 for arithmetic and logical operation such as addition and subtraction under control by the execution controller 10, a bus controller 40 to input and output the instruction codes and processing data to be processed at the execution controller 10 and the operation unit 30 via an external bus terminal 42, and a test mode controller 20. The execution controller 10, the operation unit 30 and the bus controller 40 are mutually connected via an internal data bus 39. The operation unit 30 and the bus controller 40 are provided with normal operation mode and test mode.

The execution controller 10 comprises an instruction register 12 to store the instruction code which is being executed, a control storage unit 13 to store a microprogram where processing procedures of various instructions such as data transfer and arithmetic and logical operation are described with microinstructions (ROM or RAM, for example), a micro address generator 14 to generate in sequence addresses in the control storage unit 13 of microinstructions to be executed according to the value in the instruction register 12 and a micro decoder 15 to decode the output from the control storage unit 13 and convert the microinstructions, therein to signals to control the hardware units in the operation unit 30. The output from the control storage unit 13, i.e. some of the microinstructions, may be used for address qualification at the micro address generator 14 for certain purposes including branch control of microprograms.

The operation unit 30 comprises an ALU (Arithmetic and Logical Unit) 31 for arithmetic and logical operation, a general-purpose register group 32 to store processing data for user programs, a PSW (Program Status Word) storage unit 33 to store instruction execution statuses and operation result statuses, a PC (Program Counter) 34 to indicate the address of the instruction which is being executed, and a temporary register group 35 used for processing of instruction according to the microinstructions. These components are connected to the internal data bus 39.

The micro decoder 15 outputs control signals supplied to the hardware units in the operation unit 30. Specifically, they are control signal S12, control signal S13, control signal S14, control signal S15 and control signal S16, which respectively specify the internal status of the ALU 31, the general-purpose register group 32, the PSW storage unit 33, the PC 34 and the temporary register group 35 as the operation driven to the internal data bus 39 when the logical value is "1". Control signals (not shown) to the operation unit 30 in addition to these, signals for ALU 31 to specify the operation form such as addition and subtraction, selection signals for the general-purpose register group 32 and selection signals for the temporary register group 35 using several tens of signal lines. In FIG. 1, only five control signals from S12 to S16 are shown for the sake of simplicity.

The bus controller 40 is connected to the instruction register 12 of the execution controller 10 via an instruction bus 41. The instruction code fetched from an external memory or main storage (not shown) via the external data bus terminal 42 is stored in the instruction register 12. The bus controller 40 is also connected to the internal data bus 39. Processing data in the external memory are accessed with the control signal from the execution controller 10 via the bus controller 40.

The test mode controller 20 decodes the status of a mode specification terminal group 21 and generates a test mode signal 22 to specify either of normal instruction execution mode or a test mode. The test mode signal 22 is given to the micro address generator 14 in the execution controller 10.

When the logical value of the test mode signal 22 is "0", the micro address generator 14 enters the normal instruction execution mode and generates the micro address to invoke from the control storage unit 13 the microinstruction to be executed according to the value from the instruction register 12. When the logical value of the test mode signal 22 is "1", it generates a particular micro entry address to invoke a particular microinstruction as described later irrespective of the instruction code from the instruction register 12.

Figure 2:
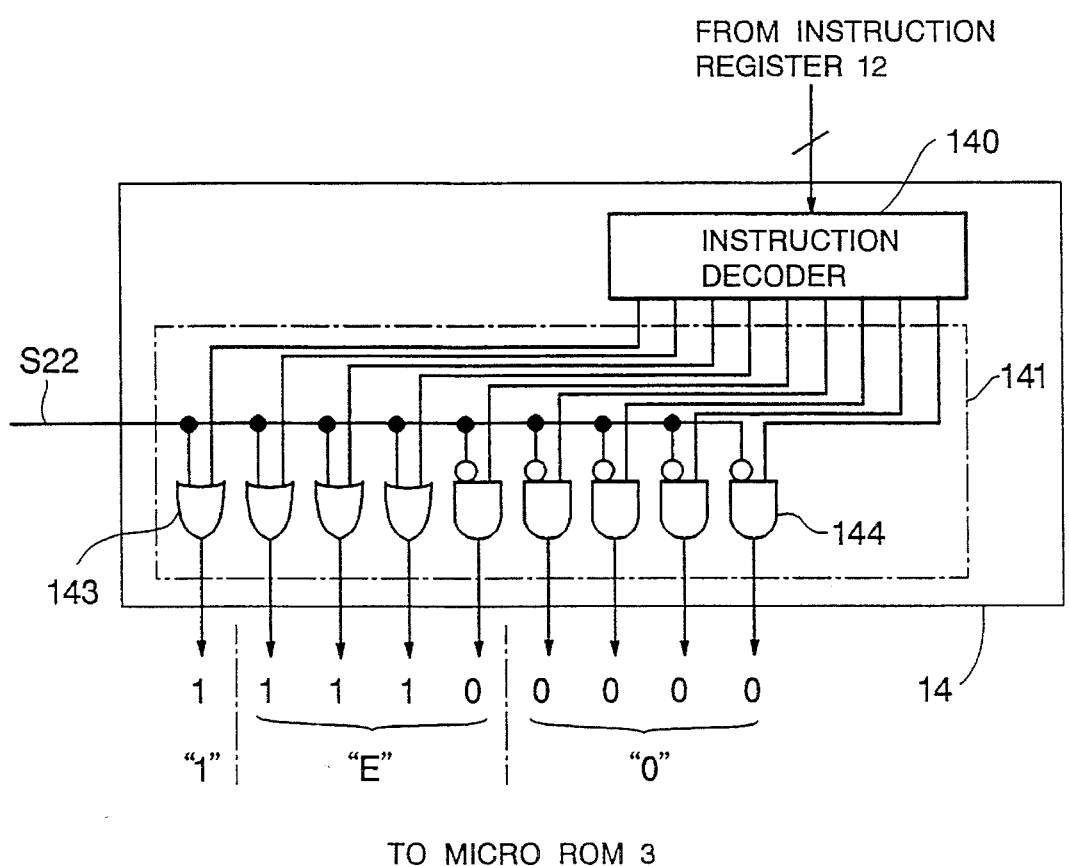
FIG. 2 is a schematic diagram to show a specific configuration example of the micro address generator.

FIG. 2 shows a specific configuration example of this micro address generator 14. In the configuration shown in the figure, an eight bit instruction code is input from the instruction register 12 and nine bit micro address is generated.

The micro address generator 14 comprises an instruction decoder 140 to decode the instruction code from the instruction register 12 and a special address output unit 141 to generate the particular micro entry address as mentioned above. The special address output unit 141 consists of OR circuits 143 and AND circuits 144, the number of which corresponds to the bit length of the address as shown in the figure.

To these OR circuits 143 and AND circuits 144, both the output from the instruction decoder 140 and the test mode signal 22 above are input and the OR/AND circuits output the logical sum or logical product of those input data. The terminal for input of the test mode signal 22 in AND circuits 144 is a low active input terminal.

In this configuration, when the test mode signal 22 has a logical value of "0", the output of the instruction decoder 140 is output to the control storage unit 13 as it is. When the test mode signal 22 has a logical value of "1", a particular micro entry address 37 1EOH" (hexadecimal notation) is always output irrespective of the value at the instruction decoder 140. The particular micro entry address is "1EOH" in this embodiment, but it is not limited to this value. The special address output by unit 141 may be designed to output a different address value.

Figure 3:
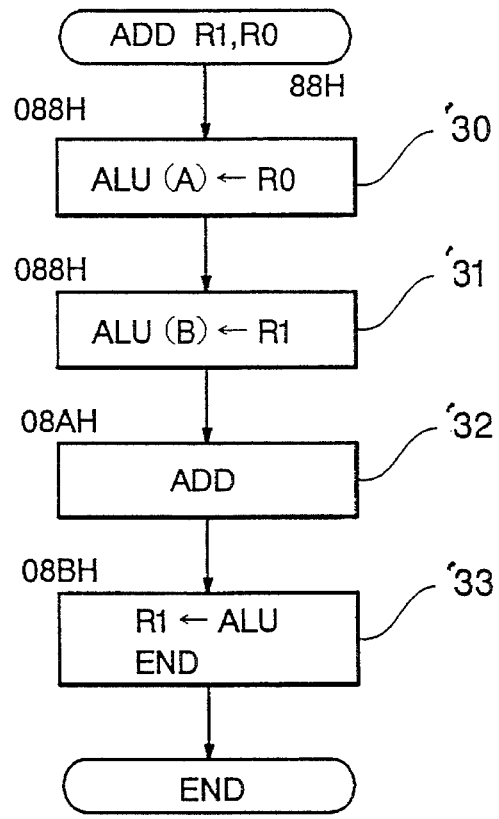
FIG. 3 is a flowchart to illustrate the operation of the microprogram performed by the inter-register addition instruction of the first embodiment.

Referring to the flowchart of FIG. 3, an example where the above microcomputer is operated by microprogram of register addition instruction is described below. Suppose the instruction code of the register addition instruction is "88H" (hexadecimal notation) and the micro address generator 14 generates "088H" as the entry address according to the value of the instruction code stored in the instruction register 12. Thereafter, the micro address generator 14 increases the address by an increment of 1 for each step of execution and generates micro addresses "089H", "08AH".... In Step 130 with the micro address "008H", the value of the register R0, which belongs to the general-purpose register group 17, is read out to the internal data bus 39 and set to the first input ALU (A) of the ALU 31. Similarly, in Step 131 with the micro address "089H", the value of the register R1 in the general-purpose register group 17 is set to the second input ALU (B). Then, in Step 132 with the micro address "08AH", the microinstruction "ADD" specifies addition to the ALU 31 for operation execution. After that, in Step 133 with the micro address "08BH", the result of addition is rewritten to the register R1 in the general-purpose register group 17 via the internal data bus 39, and upon completion of the processing, the microinstruction "END" specifies the address Generation operation with the value in the instruction register 12 for next instruction execution.

Switching to test mode is now described. When the test mode signal S22 from the test mode controller 20 has a logical value "1", as described above, the micro address Generator 14 Generates "1EOH" as a micro entry address.

Figure 4:
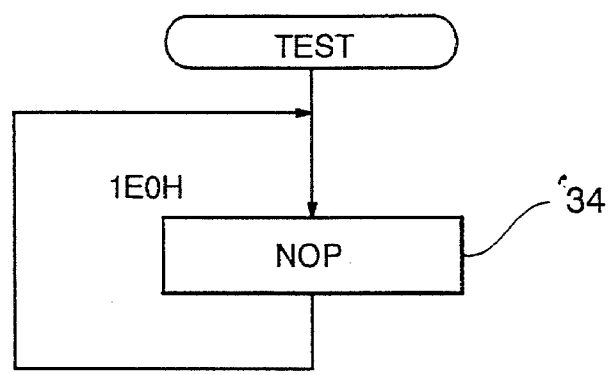
FIG. 4 is a flowchart of the operation in test mode according to the first embodiment.

FIG. 4 is a flowchart of the operation in test mode. In Step 134 with the micro entry address "1EOH", all the control signals S12 to S16 and others Generated by the micro decoder 15 are made to be non-active by execution of the microinstruction "NOP" (No operation). After that, by withholding any execution of microinstruction, the execution of Step 34 continues without any new execution of instruction.

Therefore, in test mode, all of the above control signals S12 to S16 and other control signals to instruct the operation unit 30 what to drive to the internal data bus 39 have a logical value "0", which results in no output from the operation unit 30 to the internal data bus 39.

Similarly, the control signal (not shown) connected to the bus controller 40 becomes non-active. However, the operation of the bus controller 40 is controlled by test vectors input from outside via the external bus terminal 42 in test mode, and these control signals cannot be used with switching to the external terminal 42.

As described above, the control signals S12 to S16 and other control signals become non-active in test mode, which results in separation of the operation unit 30 from the internal data bus 39. With this, the bus controller 40 can be independently tested without suffering from affect from the operation unit 30. Here, the microinstruction "NOP" in the flowchart of FIG. 4 is identical to the NOP instruction the microprogram originally has.

The micro entry address for test mode is "1EOH" in this embodiment, but it is needless to say that any address may be assigned.

Figure 5:
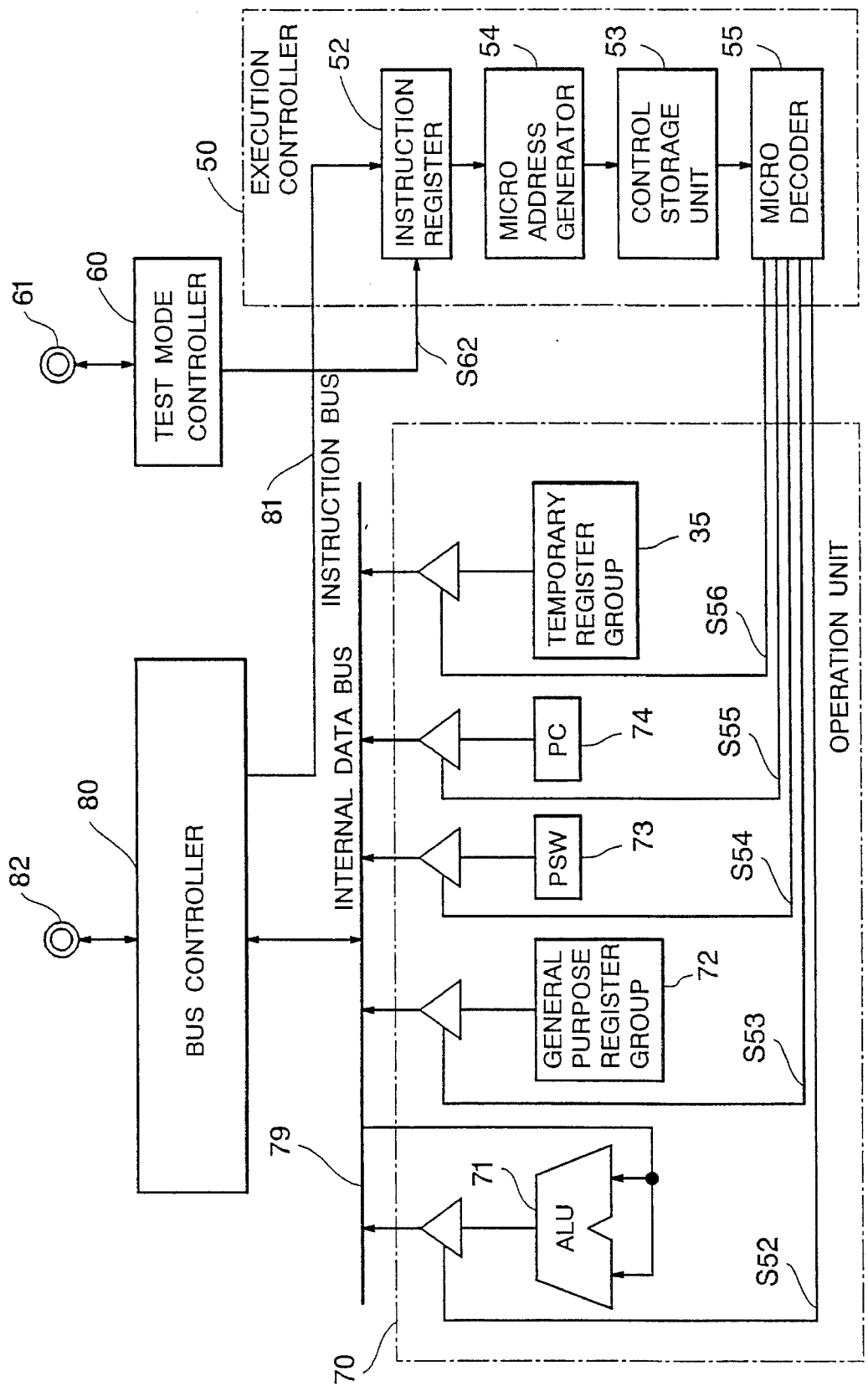
FIG. 5 is a block diagram to show the configuration of a specific configuration example of a microcomputer provided with test mode switching function according to a second embodiment of the present invention.

FIG. 5 is a block diagram to show the configuration of a microcomputer according to a second embodiment of the present invention. A microcomputer of this embodiment comprises, similarly to the embodiment of FIG. 1, an execution controller 50, an operation unit 70, a bus controller 80 and a test mode controller 60. The execution controller 50, the operation unit 70, the bus controller 80 are mutually connected via an internal data bus 79. The operation unit 70 and the bus controller 80 are provided with a normal operation mode and the test mode.

The execution controller 50 comprises an instruction register 52 to store the instruction code, a control storage unit 53 to store microprogram where processing procedures of various instructions are described with microinstructions, a micro address Generator 54 to Generate addresses of microinstructions to be executed according to the values of the instruction register 52, and a micro decoder 55 to decode the output from the control storage unit 53 and convert the microinstruction therein to signals to control the hardware units in the operation unit 70. The output from the control storage unit 53, i.e. some of the microinstructions, may be used for address qualification at the micro address Generator 54 for certain purposes including branch control.

The operation unit 70 comprises an ALU 71 for arithmetic and logical operation, a General-purpose register Group 72 to store processing data for user programs, a PSW (Program Status Word) storage unit 73 to store instruction execution statuses and operation result statuses, a PC (Program Counter) 74 to indicate the address of the instruction which is being executed, and a temporary register Group 75 used for processing of instructions according to microinstructions. These components are connected to the internal data bus 79.

The micro decoder 55 outputs control signals supplied to the hardware units in the operation unit 70. Specifically, they are control signal S52, control signal S53, control signal S54, control signal S55 and control signal S56, which respectively specify the internal status of the ALU 71, the general-purpose register group 72, the PSW storage unit 73, the PC 74 and the temporary register group 75 as the operation driven to the internal data bus 79 when the logical value is "1". Control signals (not shown) to the operation unit 70 in addition to these include signals for ALU 71 to specify the operation form such as addition and subtraction, selection signals for the general-purpose register group 72 and selection signals for the temporary register group 75 using several tens of signal lines. In FIG. 5, only five control signals from S52 to S56 are shown for the sake of convenience.

The bus controller 80 is connected to the instruction register 52 of the execution controller 50 via an instruction bus 81. The instruction code fetched from an external memory or main storage (not shown) via the external data bus terminal 82 is stored in the instruction register 52. The bus controller 80 is also connected to the internal data bus 79. Processing data in the external memory are accessed with the control signal from the execution controller 50 via the bus controller 80.

The test mode controller 60 decodes the status of a mode specification terminal Group 61 and Generates a test mode signal S62 to specify either of normal instruction execution mode or test mode. The test mode signal S62 is given to the instruction register 52 in the execution controller 50.

When the logical value of the test mode signal S62 is "0", the instruction register 52 of the execution controller 50 enters the usual instruction execution mode and outputs to the micro address Generator 54 the value of the instruction code fetched via the instruction bus 81.

Figure 6:
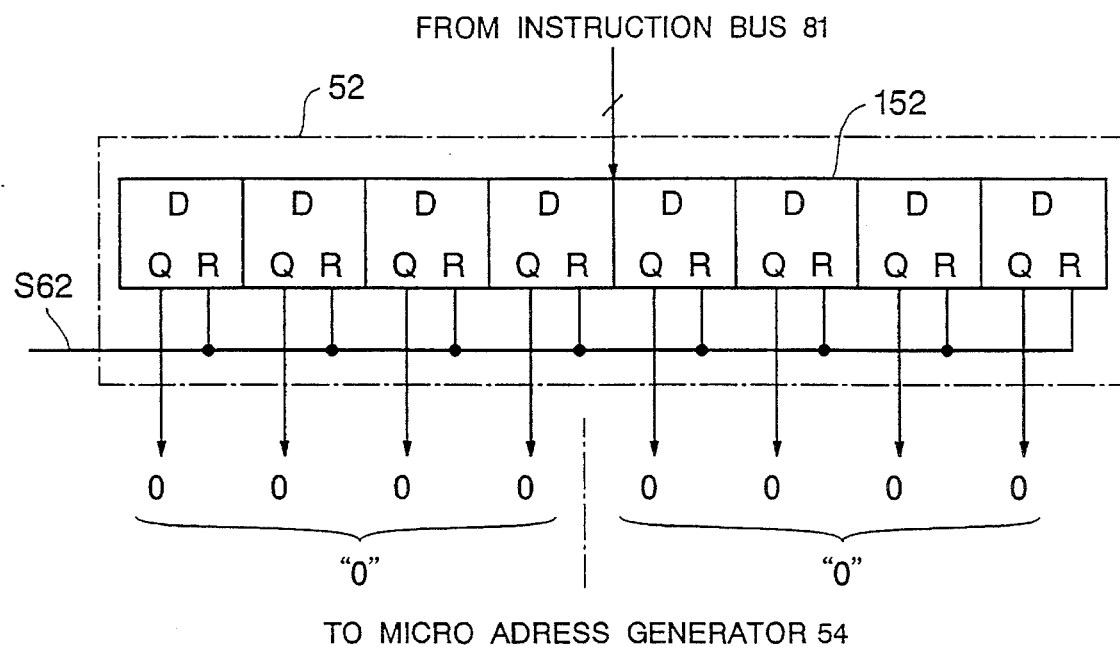
FIG. 6 is a schematic diagram to show a specific configuration example of an instruction register according to the second embodiment.

FIG. 6 shows a specific configuration example for this instruction register 52. In the FIG. 6, eight bit instruction code sent from the bus controller 80 via the instruction bus 81 is input.

The instruction register 52 comprises, as shown in the figure, D-type flip-flops 152 of which the number corresponds to the number of bits in the instruction code (8). The test mode signal S62 is input to the reset terminal R of these D-type flip-flops 152. In this configuration, when the test mode signal S62 has a logical value "0", the bits corresponding to the instruction code from the instruction bus 81 are output to the micro address Generator 54. When the test mode signal S62 has a logical value "1", D-type flip-flops 152 are reset and, irrespective of the instruction code value from the instruction bus 81, the value "00H" (hexadecimal notation) is always output as a particular instruction code (NOP instruction code).

Operation of this embodiment for the normal instruction execution mode where the micro address generator 54 generates entry addresses of the micro program according to the value stored in the execution register 52 is the same as in the first embodiment, and detailed description is omitted.

When the test mode signal S62 has the logical value of "1", the instruction register 52 switches the instruction code for output stored inside and outputs "00H", which is an instruction code for the microinstruction "NOP" of microprogram. The micro address generator 54 generates "000H" as the micro entry address for the microprogram of microinstruction "NOP" correspondingly.

Figure 7:
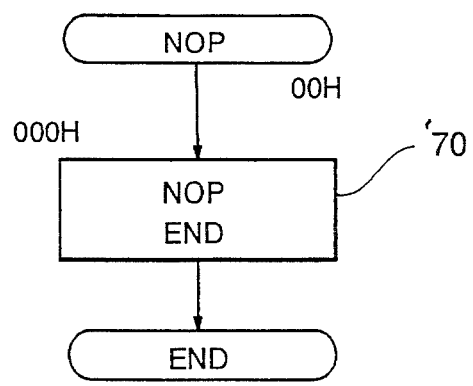
FIG. 7 is a flowchart of the operation in test mode according to the second embodiment.

FIG. 7 is a flowchart illustrating the operation of "NOP instruction".

In Step 170 where the micro entry address is "000H", the microinstruction "NOP" invoked from the control storage unit 53 makes all control signals S52 to S56 generated by the micro decoder 55 and other control signals non-active. At the same time, the microinstruction "END" is executed so that the address Generation operation is specified to the micro address Generator 54 using the value at the instruction register 52 in order for execution of the next instruction.

While the test mode signal S62 has a logical value "1", the instruction register 52 continues to output the instruction code "00H" which cause the microinstruction "NOP" is continuously executed in test mode. By continuation of the microinstruction "NOP", all of the control signals S52 to S56 and other control signals mentioned above has the same logical value "0", which results in no output from the operation unit 30 to the internal data bus 39.

The control signals (not shown) connected to the bus controller 80 are also made to be non-active. However, in test mode, the operation of the bus controller 80 is controlled by the test vectors input from the external terminal 82, and these signals are not used with switching to the external terminal 82.

As described above, as in the first embodiment, the operation unit 53 is separated from the internal data bus 51 in test mode. This enables independent testing of the bus controller 57. In this embodiment, the instruction code and the micro entry address is "00H" and "000H" respectively, but any number can be assigned.

As described above, this invention provides a microcomputer where signals can be made non-active by the operations originally furnished in the unit without adding gate circuits to disable various control signals generated according to microinstructions requiring high-speed operation and eliminates the deterioration of performance caused by test circuit incorporation. In addition, this invention realizes control for test irrespective of the number of control signals according to microinstructions, which enables preparation of test circuits with minimum hardware even with microcomputers with high performance and complicated control so that economic and general-purpose microcomputers can be provided.

Obviously many modifications and variations of the present invention are possible. It is intended to cover in the appended claims all such modifications as fall within the true spirit and scope of the invention.

What is claimed is:

1. A microcomputer provided with test mode switching function, comprising:

operation means for performing arithmetic and logic operations and selectively accessing an internal bus depending upon a control signal execution control unit for controlling the operation of said operation unit using a microprogram bus control means, connected via said internal bus to said operation means and to said execution control means via an instruction bus, for controlling input/output of various instructions and processing data; and test mode control means connected to said execution control means for controlling switching for a test mode, said execution control means comprising control storage means for storing a microprogram, a micro decoder for outputting said control signal depending upon a microinstruction read out from said control storage means, an instruction register for storing an instruction to be executed input via said bus control means, a micro address generating means for generating an address for reading out said microinstruction from said control storage means depending upon said instruction in said instruction register, said test mode control means being connected to said micro address generating means, and said micro address generating means being responsive to said test mode, for generating said address, irrespective of said instruction, and for supplying said address to said control storage means, said micro decoder setting said control signal in a predetermined logical state in response to said microinstruction read out from said control storage means depending upon said address and inhibiting access of said operation means to said internal bus, wherein said micro address generating means comprises:
an instruction decoder to decode the instruction from said instruction register; and
a number of gate circuits, the number of which corresponds to the number of bits contained in the address, an output of said instruction decoder being input to a first input terminal of each of said gate circuits and said test mode being input to a second input terminal of each of said gate circuits.

2. A microcomputer provided with test mode switching function comprising:

operation means for performing arithmetic and logical operations and selectively accessing an internal bus depending upon a control signal:

execution control means for controlling the operation of said operation means using a microprogram:

bus control means, connected via said internal bus to said operation means and to said execution control means via an instruction bus, for controlling input/output of instructions and processing data; and test mode control means connected to said execution control means for controlling switching for a test mode, said execution control means comprising control storage means for storing a microprogram, a micro decoder for outputting said control signal depending upon a microinstruction read out from said control storage means, an instruction register for storing an instruction to be executed input via said bus control means, a micro address generating means for generating an address for reading out said microinstruction from said control storage means depending upon said instruction in said instruction register, said test mode control means being connected to said micro address generating means, and said micro address generating means being responsive to said test mode, for generating said address irrespective of said instruction, and for supplying said address to said control storage means, said micro decoder setting said control signal in a predetermined logical state in response to said microinstruction read out from said control storage means depending upon said address and inhibiting access of said operation means to said internal bus, said instruction output from said instruction register comprising a code corresponding to the microinstruction for making the control signal, output from said execution control means to said operation means non-active.

3. A microcomputer provided with test mode switching function of claim 2, wherein said instruction register includes a plurality of flip-flops, the number of which corresponds to the number of bits contained in the instruction, and said test mode is input to a reset terminal of a flip-flop of said plurality of flip-flops.

4. A microcomputer provided with test mode switching function, comprising:

operation means for performing arithmetic and logical operations and selectively accessing an internal bus depending upon a control signal;

execution control means for controlling the operation of said operation means using a microprogram:

bus control means, connected to said execution control means and to said operation means via said internal bus, for controlling input/output of instructions and processing data: and test mode control means, connected to said execution control means, for controlling switching by producing a test mode signal during a test mode, said execution control means comprising:
control storage means for storing a microprogram, said microprogram including a plurality of microprogram instructions:
an instruction register for storing at least one instruction to be executed; and
micro address, generating means for generating an address of a microprogram instruction of said plurality of microprogram instructions, depending upon an instruction of said at least one instruction, wherein, upon receipt of a test mode signal, said micro address generating means generates a predetermined address of a predetermined microprogram instruction of said plurality of microprogram instructions irrespective of said instruction, a micro decoder for outputting said control signal depending upon said microprogram instruction, said micro decoder setting said control signal in a predetermined logical state and inhibiting access of said operation means to said internal bus upon receipt of said predetermined microprogram instruction, wherein said micro address generating means comprises:
an instruction decoder to decode said instruction; and
a number of gate circuits, the number of gate circuits corresponds to the number of bits contained in said address,
wherein, an output of said instruction decoder is input to a first input terminal of each gate circuit of said number of gate circuits and said test mode signal being input to a second input terminal of each gate circuit of said number of gate circuits.

5. A microcomputer provided with test mode switching function comprising:

operation means for performing arithmetic and logical operations and selectively accessing an internal bus depending upon a control signal;

execution control means for controlling the operation of said operation means using a microprogram;

bus control means, connected to said execution control means and to said operation means via said internal bus, for controlling input/output of various instructions and processing data; and test mode control means, connected to said execution control means, for controlling switching by producing a test mode signal during a test mode, said execution control means comprising:
control storage means for storing a microprogram, said microprogram including a plurality of microprogram instructions;
an instruction register for storing at least one instruction to be executed;
access means, for generating an address of a microprogram instruction of said plurality of microporgram instructions, depending upon an instruction of said at least one instruction, wherein, upon receipt of a test mode signal, said access means generates a predetermined address of a predetermined microprogram instruction of said plurality of microprogram instructions irrespective of said instruction; and a micro decoder for outputting said control signal depending upon said microprogram instruction said micro decoder setting said control signal in a predetermined logical state and inhibiting access of said operation means to said internal bus upon receipt of said predetermined microprogram instruction;

wherein said access means comprises micro address generating means for generating said address signal for said control storage means depending upon said instruction, wherein said test mode control means is connected to said instruction register, wherein said instruction register is reset by said test mode signal, and converts said instruction into a predetermined first instruction and stores said predetermined first instruction to said micro address generating means, and wherein said micro address generating means generates said address signal depending upon said predetermined first instruction and supplies said address to said control storage means.

6. A microcomputer provided with test mode switching function as in claim 5 wherein said instruction register comprises a plurality of flip-flops, the number of flip-flops corresponding to the number of bits contained in said instruction and said test mode signal is input to the reset terminal of each flip-flop of said plurality of flip-flops,

\* \* \* \* \*